(No Model.) 8 Sheets—Sheet 1.
O. TVERDAL.
CASH REGISTER AND INDICATOR.
No. 460,455. Patented Sept. 29, 1891.
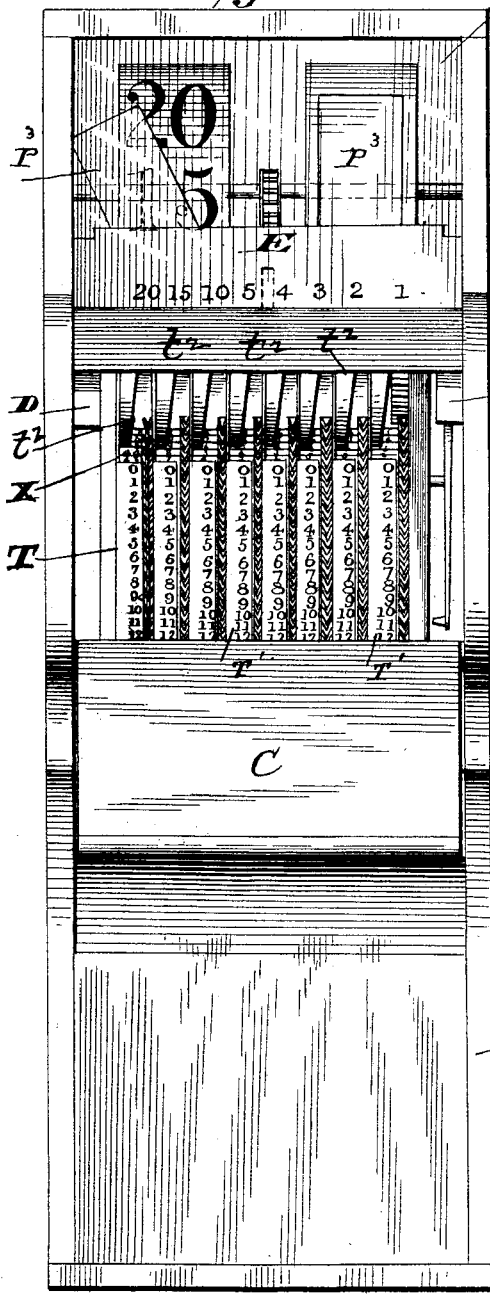
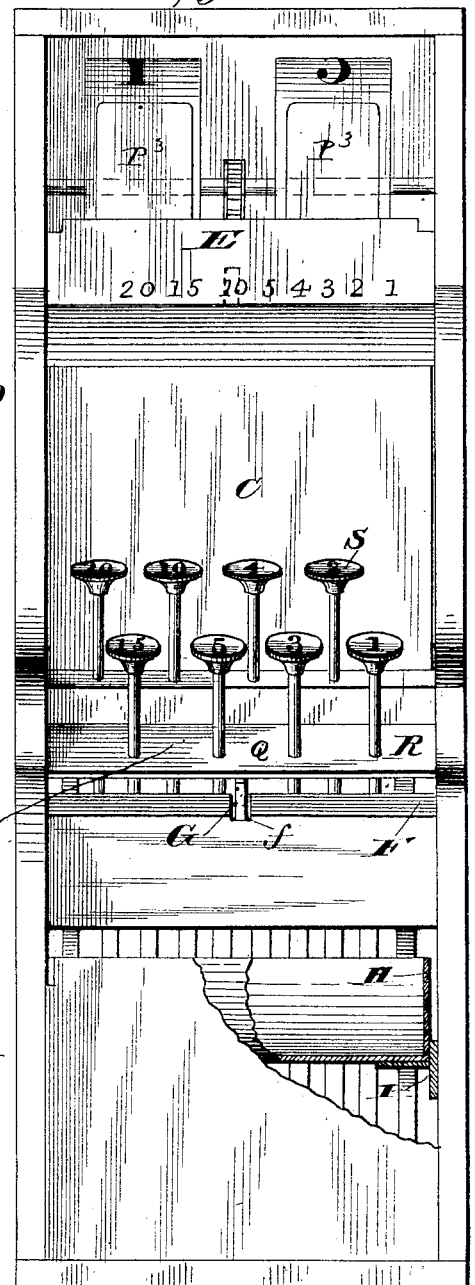
WITNESSES:
F. L. Ourand
A. L. Morsell
INVENTOR:
Ole Tverdal,
BY Sanns Ragger & Co.
ATTORNEYS.

(No Model.) 8 Sheets—Sheet 2.
O. TVERDAL.
CASH REGISTER AND INDICATOR.
No. 460,455. Patented Sept. 29, 1891.
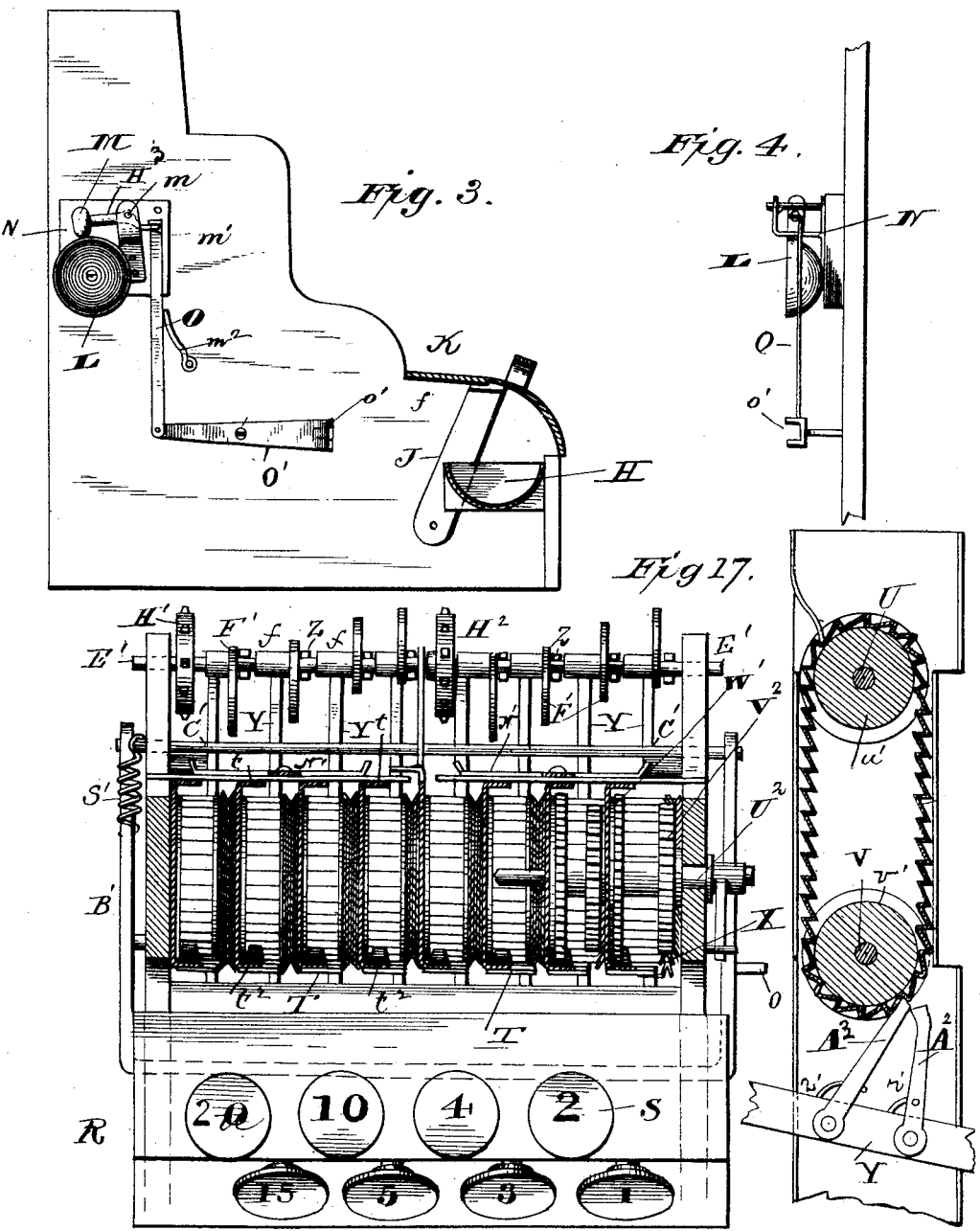

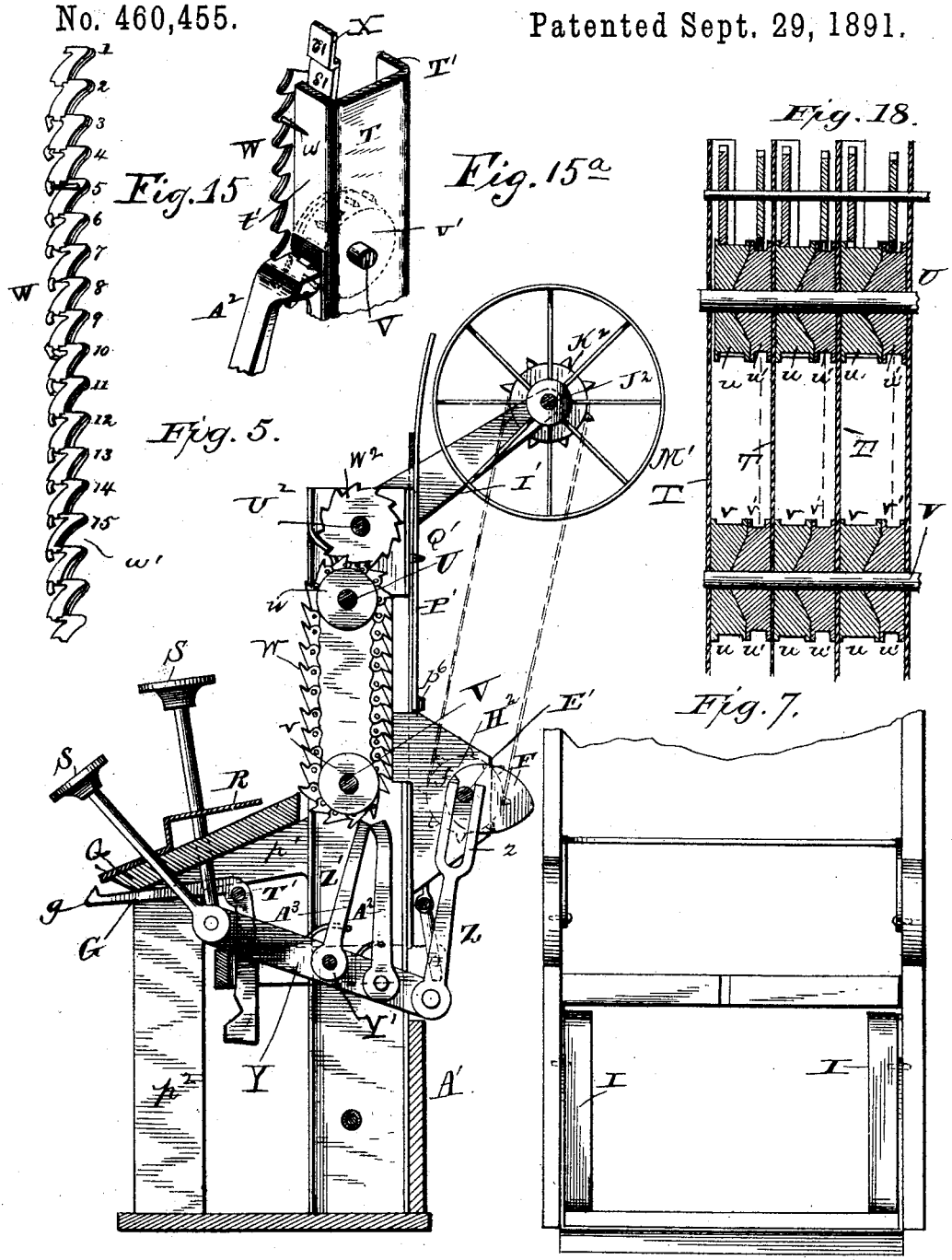

(No Model.) 8 Sheets—Sheet 4.

O. TVERDAL.
CASH REGISTER AND INDICATOR.

No. 460,455. Patented Sept. 29, 1891.

WITNESSES:
F. L. Ourand
A. L. Morsell

INVENTOR:
Ole Tverdal,
BY Sam Bagger &Co.
ATTORNEYS.

(No Model.) 8 Sheets—Sheet 5.

O. TVERDAL.
CASH REGISTER AND INDICATOR.

No. 460,455. Patented Sept. 29, 1891.

WITNESSES:
F. L. Durand
A. L. Morsell

INVENTOR:
Ole Tverdal
BY
Lauis Bagger & Co.
ATTORNEYS (No Model.) 8 Sheets—Sheet 6.
O. TVERDAL.
CASH REGISTER AND INDICATOR.
No. 460,455. Patented Sept. 29, 1891.
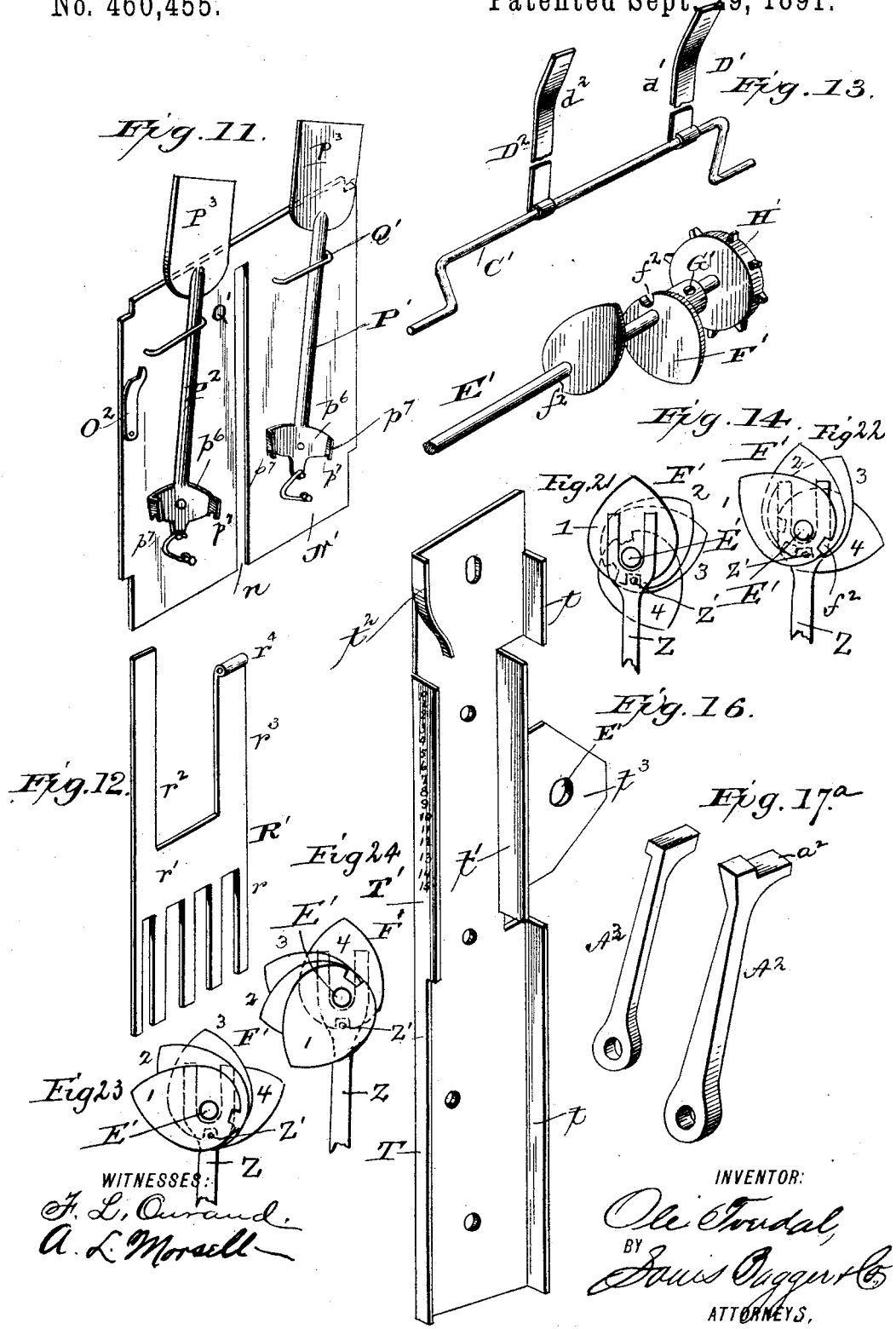
WITNESSES:
F. L. Durand.
A. L. Morsell
INVENTOR:
Ole Tverdal,
BY
Davis Daggert & Co
ATTORNEYS.

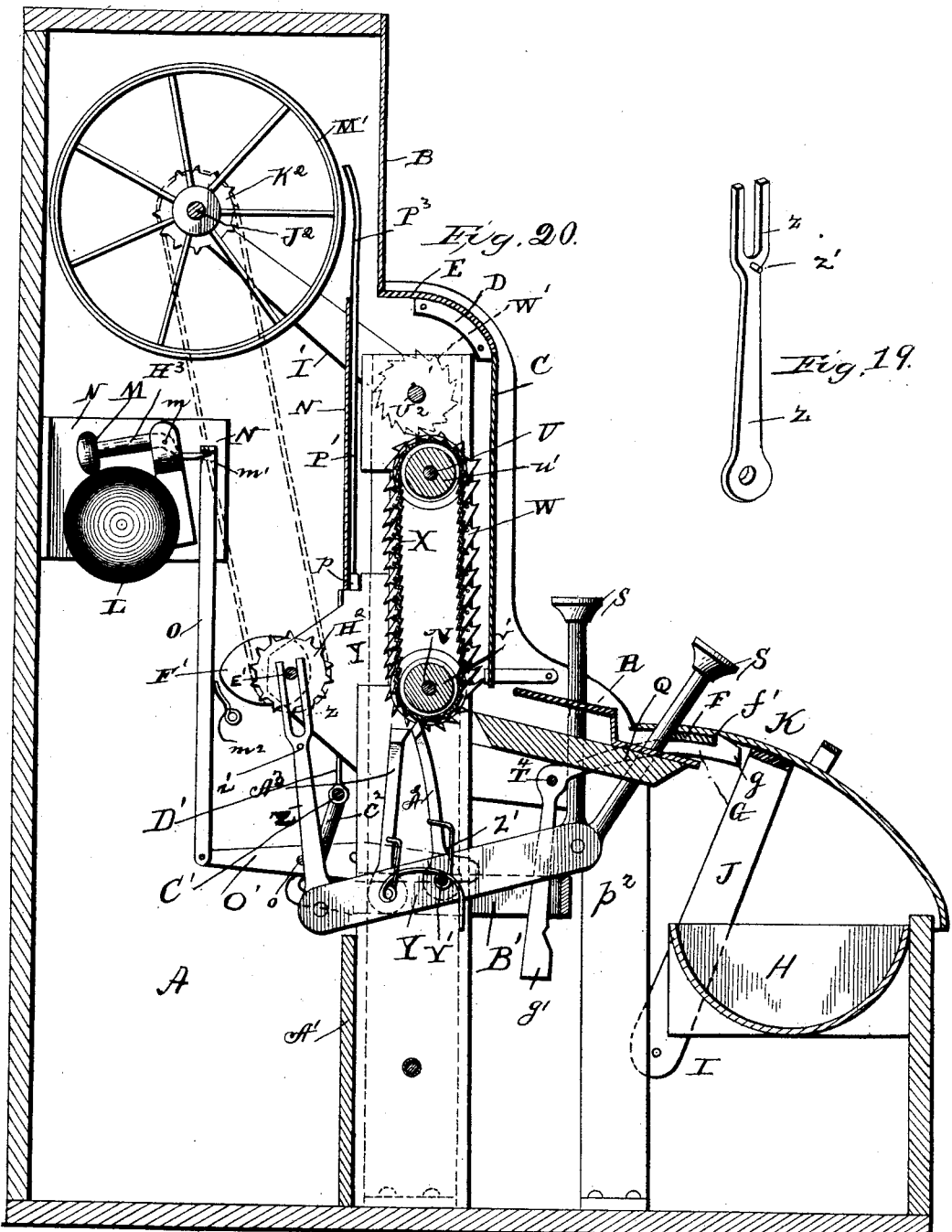

(No Model.) 8 Sheets—Sheet 8.
O. TVERDAL.
CASH REGISTER AND INDICATOR.
No. 460,455. Patented Sept. 29, 1891.
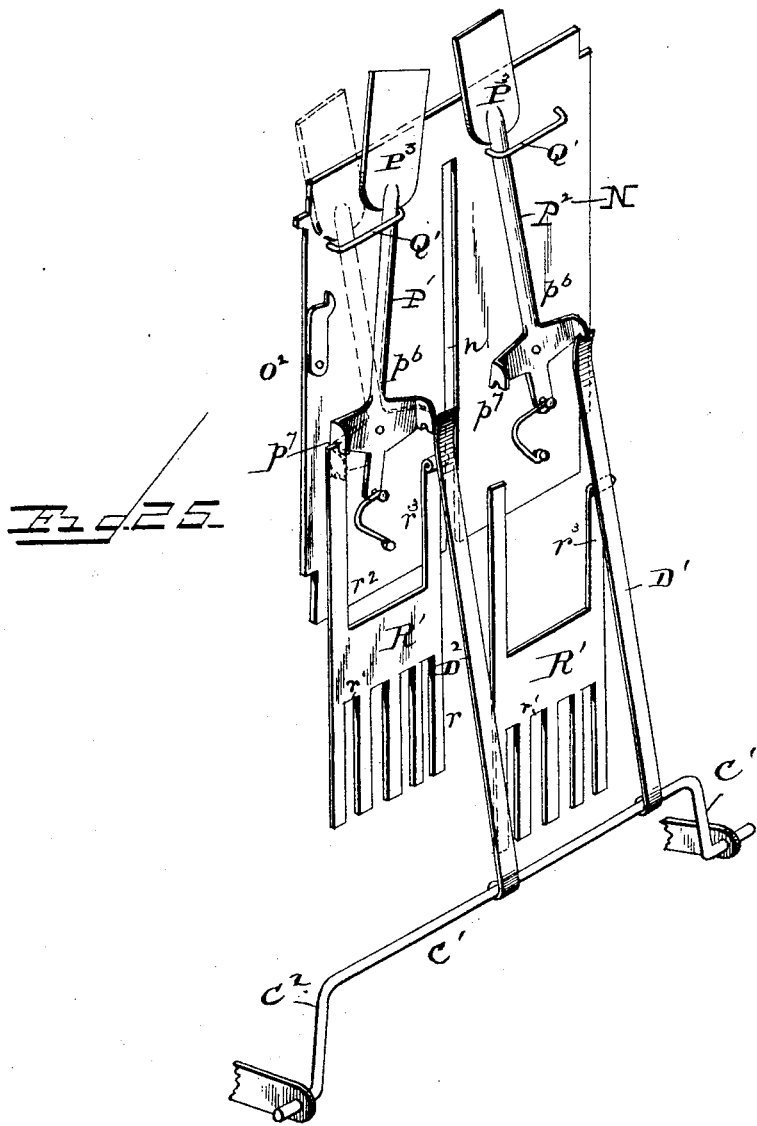
WITNESSES:
F. L. Ourand
W. L. Coombs
INVENTOR:
Ole Tverdal,
by Sumis Dagger & Co.
Attorneys.

UNITED STATES PATENT OFFICE.

OLE TVERDAL, OF CAMBRIDGE, WISCONSIN, ASSIGNOR OF ONE-HALF TO OLE BILSTAD, OF SAME PLACE.

CASH REGISTER AND INDICATOR.

SPECIFICATION forming part of Letters Patent No. 460,455, dated September 29, 1891.

Application filed June 12, 1890. Serial No. 355,203. (No model.)

*To all whom it may concern:*

Be it known that I, OLE TVERDAL, a citizen of the United States, and a resident of Cambridge, in the county of Dane and State of Wisconsin, have invented certain new and useful Improvements in Cash-Registers; and I do hereby declare that the following is a full, clear, and exact description of the invention, which will enable others skilled in the art to which it appertains to make and use the same, reference being had to the accompanying drawings, which form a part of this specification.

My invention relates to improvements in cash-registers of that class in which the sales are indicated by the depression of an appropriate key and the aggregate of such sales registered.

The invention consists in the novel construction and combination of parts hereinafter fully described, and specifically pointed out in the claims.

Figure 8:
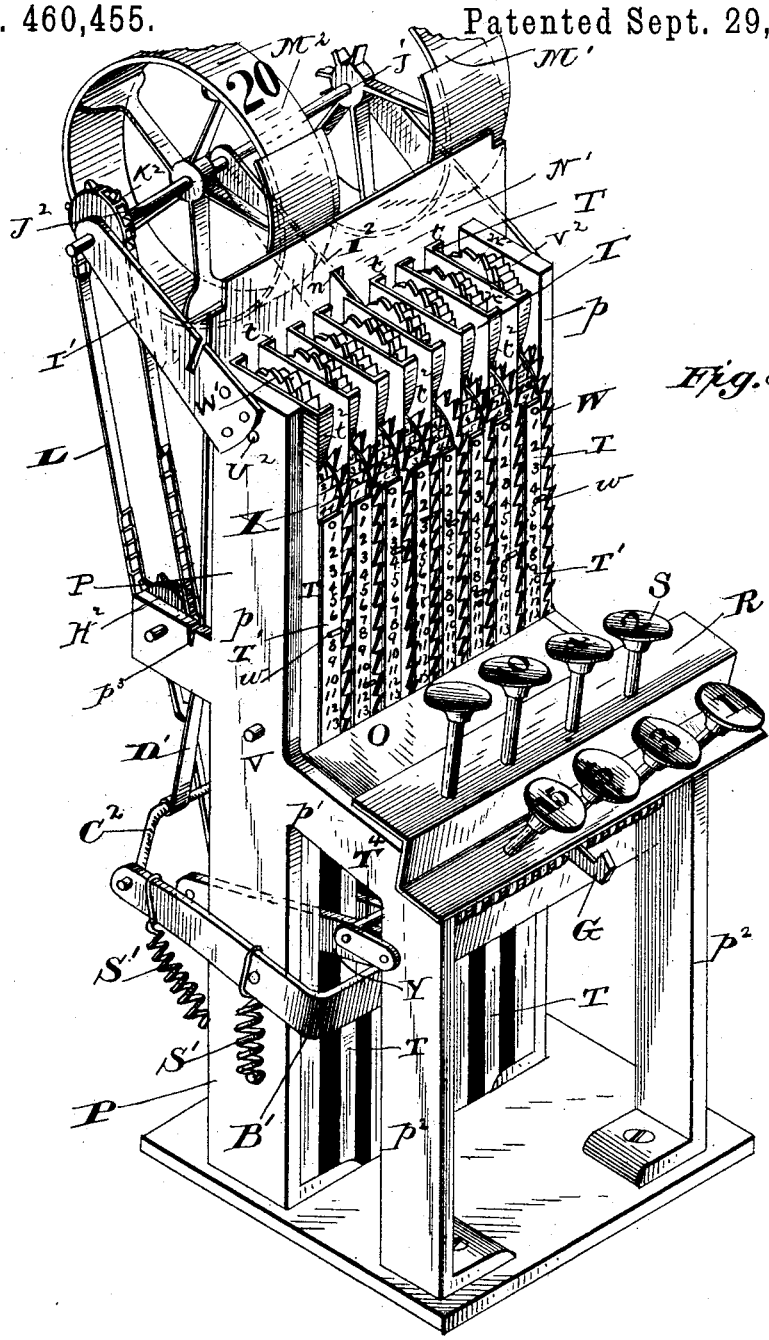
Figure 9:
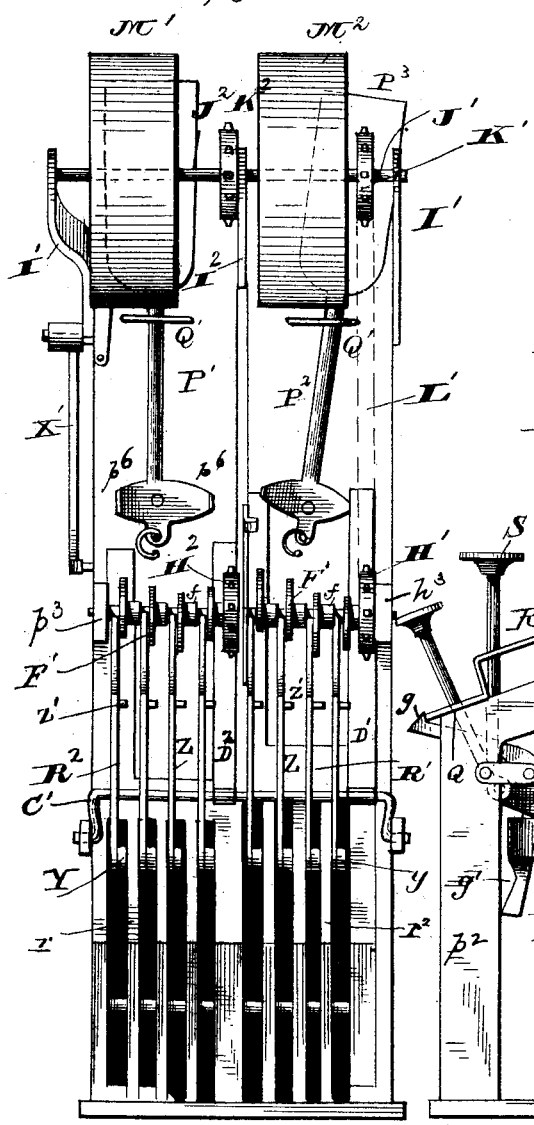
Figure 10:
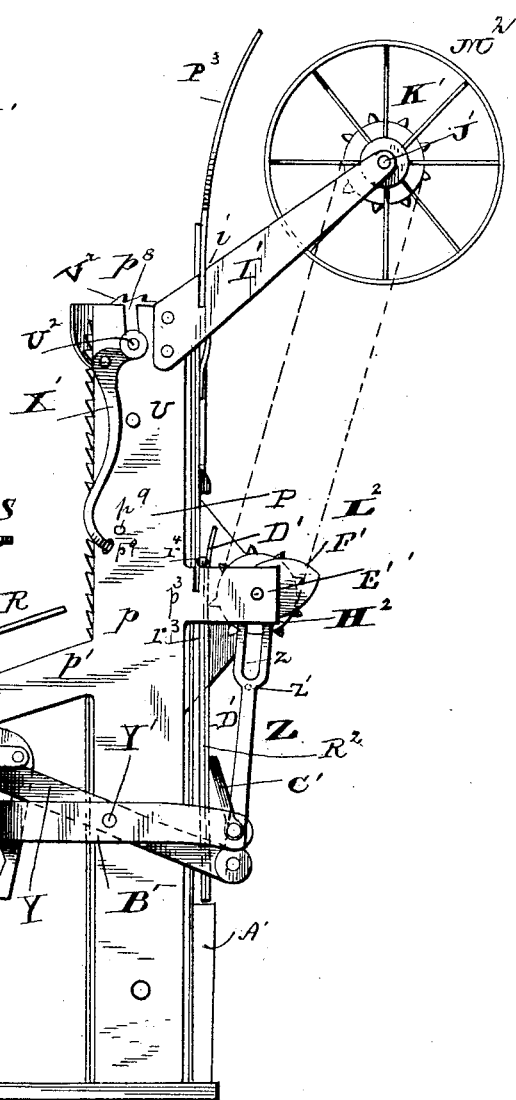

In the accompanying drawings, Figure 1 is a front elevation of the complete device, showing the cover for the front face of the machine thrown back, so as to disclose to view the graduated scales in front of the endless belts. Fig. 2 is a similar view with this cover in its normal position, while the cover for the till or cash-drawer is removed. Fig. 3 is an elevation of one of the inner sides of this casing, showing the gong mechanism, as well as the lever for operating the same, one of the ends of the latter being shown as engaging one of the side operating-bars of the mechanism proper, a portion only of said bar being shown; also showing the cash-drawer and the pivoted cover. Fig. 4 is a view of a portion of the inner side of the casing, showing an edge elevation of the gong, its hammer, and the bracket in which the hammer is mounted. Fig. 5 is a longitudinal sectional view of the device, the casing being removed. Fig. 6 is a cross-sectional view on the line *x x*, Figs. 1 and 2. Fig. 7 is a plan view of the front portion of the casing with the interior mechanism removed and also with the cash-drawer removed. Fig. 8 is a perspective view of the interior mechanism. Fig. 9 is a rear elevation of the same. Fig. 10 is a side elevation. Fig. 11 is a detail view of the rear plate carrying the spring-engaged and automatically-operating arms for displaying the amount of purchase. Fig. 12 is a detail view of one of the plates or devices for operating the arms referred to in the last-mentioned figure. Fig. 13 is a detail view of the rear transverse shaft and the arms connected thereto. Fig. 14 is a detail view of the cam-shaft. Fig. 15 is a detail side view of one of the endless belts. Fig. 15$^a$ is a detail perspective view of the same. Fig. 16 is a detail view of one of the plates which separate the series of endless belts. Fig. 17 is a detail view of one of the toothed endless belts. Fig. 17$^a$ is a view of the two pawls. Fig. 18 is a detail longitudinal section of the pulleys. Fig. 19 is a detail perspective view of one of the bifurcated arms provided with a pin by which the cams are actuated to display the amount of a sale. Fig. 20 is a central longitudinal sectional view of a complete register. Figs. 21, 22, 23, and 24 are detail views showing the cams which actuate the display-wheels in different positions. Fig. 25 is a perspective view of the plates for opening and closing the display-openings and means for actuating the same.

In the said drawings, the reference-letter A indicates the casing, provided at its front upper portion with an apertured plate B for displaying the sales as they are indicated.

The letter C designates a hinged scale or dial cover adapted to bear against cleats D D, secured to opposite sides of the casing. Fitting in these cleats D D is a plate E, provided with a series of numbers corresponding to the numbers on the keys.

Near the front of the casing the sides are connected by means of a transverse strip F, which is provided upon its upper edge and centrally with a recess *f* for the reception of the drawer-catch G, hereinafter referred to.

Arranged in the front portion of the casing is the till or cash-drawer H. A bail J is pivoted in the casing, and the horizontal portion thereof is secured to the under side of the cover K, so as to support and carry the same. The cover is provided at its upper edge, immediately over the central recess in strip F, with a notch *f'*, (see Figs. 3 and 20,) with which the end of the drawer-catch G engages, thus preventing the cover from being thrown back until a key is depressed and the catch released, as hereinafter described.

One of the inner sides of the casing is provided with a gong L, which is sounded by means of hammer consisting of a head M and an arm or handle H³, the latter being rigidly mounted upon or having formed integral therewith a shaft $m$, which has its bearings in a bracket N, secured to the casing. The end of the arm or handle is reduced and is slightly beveled on its under side, said end being designed to be engaged by the bent upper end of an arm O, pivoted at its lower end to a lever O', fulcrumed at or near its center to the casing and terminating at its inner end in a bifurcated portion $o'$, adapted to engage with a lug or stud $o$ on the U-shaped shaft, hereinafter described. It will thus be seen that when the arm O is depressed by lever O' it will carry with it the reduced end of the hammer until a certain distance is reached, when it will become disengaged and the hammer-head will fall and strike the gong and sound an alarm. A spring $m^2$, one end of which is secured to the casing, bears with its free end against the arm O, so as to press the upper bent end over the portion $m'$ upon its return stroke after being depresssed. It will be noticed that upon its return stroke the said bent end of arm O will strike the beveled under side of the handle and will be deflected out of the path thereof and clear the same, when it will be returned to normal position by the spring $m^2$, as set forth.

The supporting frame or skeleton of the interior mechanism is indicated by the letter P, said frame consisting of the uprights $p\ p$, the forwardly and downwardly inclined portions $p'\ p'$, and the standards or uprights $p^2\ p^2$, while from the rear of the uprights $p\ p$ project the arms $p^3\ p^3$. Between the forward downwardly-projecting arms $p^2\ p^2$ is arranged a key-board Q and above the same the key-plate R, both of which are provided with registering apertures through which the key-levers pass. The space between the uprights $p\ p$ is subdivided by means of vertical partitions T, (see Figs. 5, 8, 17, and 20,) which extend from the bottom to the top thereof. These partitions are of peculiar shape, (shown in detail in Fig. 16 of the drawings,) being widened at both the upper and lower ends, which enlargements are provided with flanges $t\ t$, while the portions intermediate of the enlarged ends are also flanged, as indicated at $t'$. When in place, these partitions form boxings, which inclose the pulleys and the operating-belts by which the sales are registered. The front portions of the flanges of the upper enlarged ends are formed into index-fingers $t^2$, while the front portions of the intermediate portions constitute dials or scales T', having consecutively arranged thereon numbers from 0 to 15, as seen in Figs. 1, 8, and 16.

The central partition T is formed somewhat differently from the others, as seen in Fig. 16, being provided with a rearwardly-extending wing $t^3$, which with the rearwardly-extending arms $p^3\ p^3$ form bearings for the cam-shaft hereinafter described.

The letters U and V indicate, respectively, an upper and lower transverse shaft fixed in the uprights $p\ p$ and having loosely mounted thereon, between the divisional partitions, grooved rollers $u\ u'$ and $v\ v'$. Over the rollers $u'\ v'$ pass endless toothed belts W, provided at intervals of every fifteen teeth with lateral fingers $w$, Fig. 8, which as the toothed chains are rotated, as hereinafter described, point to the proper numbers on the scale as successive sales are made. For instance, if the toothed belts are adjusted so that these fingers indicate zero and an appropriate key is depressed—say the key indicating a five-cent sale—the corresponding belt will be actuated and the finger will move downward from "0" to "1," thus indicating that a sale to the value of five cents has been made. As another sale is made, the key is again depressed, when the finger will move to "2," and so on, until the bottom of the scale, or number "15," is reached, at which point the next succeeding finger is at zero, so that on the following depression of the key the first finger will leave "15" and the next finger will indicate "1." Over the rollers $u\ v$ pass endless belts X, Figs. 8 and 15ª, said belts having their faces formed of a series of teeth upon which are arranged consecutively numbers running from 0 to 40. Both the belts W and X move the rollers around which they pass, being actuated by the keys and connections hereinafter described. Each key-lever has pivoted at its lower end a pitman Y, which passes between the partition-strips (see Figs. 6 and 8) and articulates with the lower ends of arms Z, which have their upper ends bifurcated at $z$, being provided with lateral studs or pins $z'$, Figs. 19 and 20. In the drawings I have shown the apparatus as provided with eight keys only. In practice, however, I propose to employ thirty, when of course it will be necessary to increase the number of pitmen and arms correspondingly. The ends of the pitmen are supported when in their usual positions by means of a transverse piece A'.

The letter B' indicates an approximately U-shaped rock-shaft pivoted on a transverse shaft passing through the uprights $p\ p$. A transverse shaft C' is arranged at the rear of the frame-work, having downwardly-extending arms C², pivotally connected with the rear ends of the U-shaped rock-shaft. This shaft C' is provided at one end and also at the center (see Fig. 9) with upwardly-extending arms D' D², having their upper ends bent outwardly, as seen at $d'\ d^2$, Figs. 13 and 25. Cam-shafts E' are journaled in the rearwardly-extending arms $p^3\ p^3$ and wing $t^3$ and carry a series of heart-shaped cams F', corresponding in number to the keys employed. These cams are mounted upon the shaft at different inclinations and have formed integral therewith lateral collars, which receive set-screws G', whereby the cams may be adjusted in order to secure the proper inclination. The bases of the cams are also slotted or recessed, as seen at $f^2$. The bifurcated ends of the arms Z are located between the cams. The cam-shafts have also mounted thereon sprocket-wheels H' H², Figs. 8 and 9.

Extending rearwardly and obliquely from the upper ends of the standards $p$ $p$ are arms I' I'. A central arm I² (see Fig. 8) also extends from the upper end of the central partition T. These arms receive loosely-mounted transverse shafts J' J², each shaft having rigidly mounted thereon sprocket-wheels K' K². Endless belts L' L² pass over these wheels and wheels H' H², and are only provided with links to receive the sprockets at their upper and lower ends, which are the only portions that turn upon the sprocket-wheels. The shafts J' J² have also rigidly mounted thereon wheels M' M², the periphery of wheel M' being provided with numbers corresponding to the keys upon the right of the key-board and wheel M² provided with numbers corresponding with those on the left of the key-board. These wheels are also so located upon the shaft that the numbers as they are brought to view are plainly discernible through the front apertured plate.

The letter N' indicates a rear plate, Figs. 11 and 20, which is slitted longitudinally, as indicated at $n$, Fig. 25, in order to accommodate itself to the rearwardly-projecting arm I² and the dividing portion $t^3$ of the central partition T. Pivoted to one side of the rear plate is a notched arm O², which is designed to engage the rearwardly-extending arm I', so as to retain the plate in proper position.

The letters P' P² indicate vertical arms pivoted to the plate N', the upper ends working in guides or bails Q' Q', secured to the plate, and said upper ends being enlarged or provided with covering-plates P³, so that when in their normal position they will completely hide from view the numbers upon the wheels M' M². The lower ends of the arms are formed with transverse extensions $p^6$ $p^6$, having their ends flanged rearwardly and notched, as indicated at $p^7$ $p^7$.

The letters R' R² indicate plates located between plate N' and the transverse shaft C', Figs. 9 and 12. These plates are provided with a series of downwardly-extending arms $r$ $r$, which pass between the pitmen, transverse portions $r'$ $r'$, (which normally rest upon the pitmen Y,) and upon opposite ends with arms $r^2$ $r^3$. It will be noticed that the arms $r^3$ are somewhat shorter than arms $r^2$ and have their ends turned over rearwardly, as indicated at $r^4$, against which normally rest the outwardly-inclined ends $d'$ $d^2$ of the arms D' D², Figs. 10 and 25.

The U-shaped rock-shaft B' has secured to each of its rearwardly-extending arms springs S' S', which serve to return said rock-shaft to its normal position after depression.

The drawer-catch G, hereinbefore referred to, is mounted upon a transverse forward shaft T⁴ and has its upper end provided with a beveled shoulder $g$, which works in the notch $f$ of the transverse strip F and also in the depression or notch $f''$ of the till-cover. The lower vertical portion of this catch is also provided with a beveled lug $g'$, which when a key is depressed (and consequently the U-shaped rock-shaft) will be struck by the latter and shoulder $g$ be thrown out of engagement with the drawer-cover, so as to allow the till to be uncovered. A transverse shaft U² runs through the upper portion of the central partition, and between each divisional strip upon said shaft are mounted two cog-wheels V² and W', the smaller V² being adapted to be thrown into gear with the endless belts W and the larger ones with belts X. Normally these cogs are not in gear. The shaft which carries these cogs passes through elongated slots in the partitions, and its ends are mounted in elongated recesses $p^8$ $p^8$ in the upper ends of the uprights $p$ $p$. A lever X', pivotally secured to the upright $p$, engages one end of the shaft, and its lower end is bent inwardly and adapted to engage perforations $p^9$ $p^9$ in the upright, Fig. 10. When the inwardly-bent end is engaging the innermost perforation, the cogs are out of mesh with the belts, whereas when the end of the lever is in engagement with the outer perforation the shaft and cogs are thrown downward, so as to permit the latter to mesh. The object of this mechanism is to enable all the belts X and W to be moved simultaneously in order to facilitate the setting thereof at the beginning of a day's business. A suitable key (not shown) may be employed to rotate shaft U².

The letter Y' indicates a transverse shaft having its ends extending out from the uprights $p$ $p$ and forming points upon which the U-shaped rock-shaft turns. This shaft passes through the series of pitmen and forms a fulcrum therefor. Between each of the pitmen Y is located a spring Z', one portion of said spring being secured to shaft Y' and the ends secured to pawls A² A³, pivotally secured to the pitmen. These springs serve the function of facilitating the return of the pawls A² after having been raised by the pitmen. These pawls A², when the pitmen are actuated, are designed to engage the teeth of the toothed endless belts W and the cogged endless belt X. The pawls A² are provided with lateral beveled shoulders $a^2$, and each belt W at intervals of every fifteen teeth has the slit between the teeth deeper than the others, as indicated at $w'$. (See Fig. 15.) By this construction when one of the fingers of the toothed endless belt W has traversed over the scale from 0 to 15 this deep slit will be in position to be engaged by the pawl, which will fall into the slit to its fullest extent, and thus bring the shoulder $a^2$ into engagement with the cogged endless belt X, moving the same simultaneously with the belt W. If it is assumed that the belt X, thus operated, is set so that the front index-finger $t^2$ points to "0," it is obvious that the belt will be so shifted as to bring the index-finger to "1," thus indicating that the belt W has traversed the front scale once and disclosing the fact that fifteen sales of the denomination indicated by the appropriate key have been made. By this means an accurate account may be made at any time of the day or at the close of the day of the aggregate sales by simply multiplying the figures indicated by the finger $t^2$ by fifteen.

The operation of the device is as follows: At the beginning of business one of the lateral fingers on each belt W is placed at "0," so that they will all point thereto. These belts X are also so arranged that all the fingers $t^2$ of the vertical partitions indicate "0." The parts are now in the positions shown in Figs. 5, 10, and 20, with the end $g$ of the drawer-catch engaging with the notch in the till-cover, so as to hold the same in place, and the front ends of the pitmen Y resting on the transverse portion of the U-shaped rock-shaft. Supposing now a sale is made, say, of five cents, the key denoting this amount is depressed, depressing in turn the U-shaped rock-shaft, which engages with the beveled lug $g'$ of the drawer-catch G and throws the shoulder $g$ out of engagement with the notch in the till-cover, so that the latter can be opened and the amount of the sale placed in the till. As the front end of the pitman is depressed its rear end will be elevated, carrying with it the pawls $A^2$, which, engaging with the toothed belt W, will cause the same to be actuated to the extent of one tooth, the lateral finger on the belt moving downward a corresponding distance and pointing to "1" on the scale, thus indicating that one sale of the value of five cents has been made. As the rear end of said pitman rises it also carries with it the arm Z, connected therewith, and the lateral lug or pin $z'$ thereon will come in contact with the under side of its appropriate cam $F'$, which will be actuated a distance corresponding to the inclination of said cam on the rock-shaft $E'$. This will cause said rock-shaft to be partly rotated, which, through the medium of cog-wheels $K^2$ and $H^2$ and belt $L^2$, will cause wheel $M'$ to be correspondingly rotated and the amount of the sale indicated or displayed at the apertured plate in the front of the apparatus, the said lug $z'$ engaging with the notch in the base of the cam and limiting the movement of wheel $M'$ at the proper time. When pressure upon the key is removed and it returns to normal position, the wheel $M'$ will remain in this position until the key denoting a different amount is struck, when the same operation will be repeated with said last-mentioned key. Its heart-shaped cam, however, being set at a different inclination, will cause a correspondingly different degree of motion to be imparted to wheel $M'$ and a different amount, corresponding to that of said last-mentioned key, to be displayed. When fourteen sales have been made by any of the keys and the finger on the endless belt points to "14" on the scale, the deep slit $w'$ on said belt will be in position to be engaged by the beveled shoulder $a^2$ of pawl $A^2$ upon the next depression of the key, the slit $w'$ allowing said shoulder to be projected forwardly a distance sufficient for it to engage with one of the teeth on belt X, so that on said depression of the key the belt W will be moved so that the index-finger $w$ will point to "15" and the belt X be moved one tooth, so that the figure "1" will be indicated by index-finger $t^2$, thus showing that said finger $w$ has traversed the scale once and that fifteen sales of that particular value have been made. The next finger $w$ on the belt W will now point to "0," so that when another sale is made said first-mentioned finger $w$ will leave "15" and the last-mentioned finger will point to "1." This operation is repeated until the new finger traverses the scale, when belt X will be again actuated to the extent of a tooth, whereby the figure "2" will be indicated by finger $t^2$, thus indicating that thirty sales have been made, and so on. It will be understood that the shoulder $a^2$ of pawl $A^2$ can only engage with and actuate belt X when the same comes opposite the deep slit $w'$ in belt W, said deep slit and the fingers $w$ being so arranged relatively to each other that belt X will be actuated once to every fifteen movements of the finger traversing the scale. As the U-shaped rock-shaft is actuated upon the depression of a key, the lug $o'$ thereon, engaging with the bifurcated end of lever $O'$, will actuate arm O and sound an alarm.

The manner of opening and closing the display-apertures in the front of the apparatus is as follows: It will be noted that the wheels $M'$ and $M^2$ are used in connection with the keys on the left and right hand sides of the apparatus, respectively. When a sale is indicated by a key on one side of the device, the plate on that side should be open or shifted so that the display-aperture is uncovered, while the opposite plate is closed. These plates should remain in these positions so long as the sales are indicated by keys on such side of the device; but when a key on the opposite side is actuated the positions of said plates should be reversed, so that the one that was open shall be closed, and vice versa. With this end in view we will suppose one of the keys on the left side of the device (looking from the front) is depressed. The rear end of the pitman in rising will elevate the plate $R'$, the arm $r^2$ of which will strike the inner side of the transverse extension of arm $P'$, causing it to be shifted to one side, thus uncovering the display-opening. (See Fig. 9.) At the same time that plate $P'$ is raised the arms $D'$ $D^2$ will be elevated by the U-shaped rock-shaft, and if some provision were not made whereby arm $D'$ would clear the opposite end of the extension $p^6$ it would come in contact therewith and prevent the plate from being shifted. It will be seen, however, that the bent end $d'$ of arm D′ will rest upon the turned end of arm $r^3$, and as arm D′ and plate R′ move together, although operated by different means, said arm D′ will clear said extension. When the key resumes its normal position, the plate R′ and arm D′ will fall; but plate P′ remains in its shifted position and so long as the sales are indicated by the keys on this side of the device will stay in such position. If, however, a key on the opposite side be depressed, plate R′ will not be elevated; but the arm D′ will ride over the end of arm $r^3$, engage with the outer end of extension $p^6$, and shift plate P′ so as to close the display-opening. At the same time plate $R^2$ will shift and open plate $P^2$ by means of arm $r^2$ in a similar manner to that by which plate P′ was opened. It will be noted that plates R′ and $R^2$ are only elevated when their respective keys are depressed, while arms D′ $D^2$ are elevated every time a key is depressed, no matter which side of the device said key is located upon.

I have illustrated and described the device as being divided into two divisions with two display-wheels, two cam-shafts with four cams each, and eight keys; but it is obvious that these parts may be duplicated or otherwise increased without departure from the invention.

In Figs. 21, 22, 23, and 24 I have illustrated the cams F in different positions. These cams are marked, respectively, 1, 2, 3, and 4, and are actuated by the arms Z, connected with the twenty-cent, fifteen-cent, ten-cent, and five-cent keys, respectively.

Having thus described my invention, what I claim, and desire to secure by Letters Patent of the United States, is—

1. In a cash-register, the combination of a casing, a transverse strip provided with a central notch, a drawer and drawer-cover, the latter provided upon its interior surface with a central notch, operating mechanism located within the casing, a transverse shaft having bearings in the frame-work of said operating mechanism, a catch mounted upon said shaft and provided at its upper and lower ends with beveled shoulders, the former fitting in the central notch of the transverse strip and engaging the central notch of the drawer-cover, and a U-shaped rock-shaft adapted to engage the lower beveled shoulder of the catch, whereby upon the depression of a key the cover is automatically released, substantially as set forth.

2. In a cash-register, the combination of a casing, frame-work within said casing, upper and lower transverse shafts mounted in the frame-work, endless belts passing over said shafts, one of said belts being toothed and the other cogged, the former provided with a series of index-fingers and the latter having a series of graduated numbers thereon, a series of key-levers, pitmen connected to said key-levers, spring-actuated pawls adapted to engage the toothed endless belts, index-plates secured to the front of the endless cogged belts and having a series of numbers thereon, and means for moving the latter belts one cog each time an index-finger on the toothed belts traverses the entire length of the index-plates, substantially as set forth.

3. In a cash-register, the combination of a casing, frame-work within said casing, upper and lower transverse shafts mounted in the frame-work, endless belts passing over said shafts, one of said belts being toothed and the other cogged, the former provided with a series of index-fingers and having the slit between the teeth at suitable intervals deeper than the intermediate slits and the latter belts having a series of graduated numbers thereon, a series of key-levers, spring-actuated pawls adapted to engage and actuate the toothed belts and provided with lateral beveled shoulders which engage the cog belts each time the pawl proper enters the deeper slits of the toothed belts, and index-plates secured to the front of the endless cogged belts, substantially as set forth.

4. In a cash-register, the combination of a casing, frame-work within said casing, partitions between the uprights of the frame-work, having their upper and lower ends enlarged and their edges flanged laterally throughout their entire length, the front flanges of the upper enlarged ends being formed into index-fingers and the front flanges of the intermediate portions provided with a series of numbers, upper and lower transverse shafts mounted in the frame-work, endless belts passing over said shafts, one of said belts being toothed and the other cogged, the former provided with a series of lateral index-fingers and the latter having a series of graduated numbers thereon, a series of key-levers, pitmen connected to said key-levers, spring-actuated pawls adapted to engage the toothed endless belts, and means for moving the latter belts one cog each time an index-finger on the toothed belts traverses the entire length of the index-plates, substantially as set forth.

5. In a cash-register, the combination of a series of key-levers, pitmen connected thereto, arms connected to the rear ends of said pitmen and provided with lateral projections and bifurcated upper ends, a cam-shaft which the bifurcated ends of the arms engage, said shaft having mounted thereon a series of differently-inclined heart-shaped cams provided with a notch in their base and also carrying a central and end sprocket-wheel, an upper shaft having mounted thereon a central and end sprocket-wheel and also wheels having their peripheries numbered to correspond with the numbers upon the keys, and endless belts passing over the sprocket-wheels of the upper and lower shafts, the portions thereof which engage said wheels being linked, substantially as set forth.

6. In a cash-register, the combination of a series of levers, pitmen connected thereto, arms connected to the rear ends of said pitmen and provided with lateral projections and bifurcated upper ends, a cam-shaft which the bifurcated ends of the arms engage, said shaft having mounted thereon a series of differently-inclined heart-shaped cams provided with a notch in their base and also carrying a central and end sprocket-wheel, an upper shaft having mounted thereon a central and end sprocket-wheel and also wheels having their peripheries numbered to correspond with the numbers upon the keys, endless belts passing over the sprocket-wheels of the upper and lower shafts, the portions thereof which engage said wheels being linked, pivoted arms having their upper ends enlarged to normally obscure the number upon the wheel, and means, substantially as described, whereby said arms are operated so as to automatically disclose or hide from view the numbers upon the wheels when keys either upon the right or left of the key-board are alternately depressed, substantially as set forth.

7. In a cash-register, the combination of a series of key-levers, pitmen connected thereto, a U-shaped rock-shaft, a transverse shaft secured to the rear end of the rock-shaft, said transverse shaft being provided with end and central upwardly-extending arms having their upper ends inclined outwardly, arms pivotally secured to the rear of the frame-work, having their upper ends enlarged and provided near their lower ends with transverse flanged portions, and rear plates having a series of downwardly-projecting fingers adapted to pass between the pitmen and also provided on one end with an upwardly-extending long arm, on the opposite end with a shorter arm having its upper end turned over rearwardly, and intermediate said arms provided with a set of similarly-constructed arms, substantially as set forth.

8. In a cash-register, the combination of a series of key-levers, pitmen connected thereto, a U-shaped rock-shaft, a transverse shaft secured to the rear ends of the rock-shaft, said transverse shaft being provided with end and central upwardly-extending arms having their upper ends inclined outwardly, a plate fitted to the rear of the frame, arms pivotally secured to said plate, passing through guides upon the plate, and having their upper ends enlarged, and provided near their lower ends with transverse flanged extensions, and plates to the rear of the first-named plate, said plates having a series of downwardly-projecting fingers adapted to pass between the pitmen and also provided on one end with an upwardly-extending long arm, on the opposite end with a shorter arm having its upper end turned over rearwardly, and intermediate said arms provided with a set of similarly-constructed arms, substantially as set forth.

9. In a cash-register, the combination of a casing, frame-work within the same, rearwardly-extending arms projecting from said frame-work, said arms provided with slits and having journaled in the ends thereof a shaft carrying sprocket-wheels and also a series of differently-inclined cams, upwardly-inclined arms secured to the standards of the frame-work, partitions between said standards, the central partition being provided with a rearwardly-extending portion, a rearwardly-extending arm secured to the upper end of the central partition, shafts mounted between this arm and the arms projecting from the uprights, said shafts each carrying a sprocket-wheel and a wheel provided upon its periphery with a series of numbers, belts for connecting the lower sprocket-wheels with the upper ones, a rear plate having a central slit to receive the arm projecting from the central partition and also provided upon opposite sides, at its bottom and top, with projecting shoulders adapted to be seated, respectively, in the slits of the arms which form the bearing for the cam-shaft and in the corresponding slits in the arms projecting from the upper ends of the uprights, an arm pivoted to this plate and provided with a notch adapted to engage one of said last-named rearwardly-extending arms, spring-pressed arms secured to the plate, means for rotating the cam-shaft, and means for operating the spring-pressed arms, substantially as set forth.

In testimony that I claim the foregoing as my own I have hereunto affixed my signature in presence of two witnesses.

OLE TVERDAL.

Witnesses:
F. C. STAGG,
S. H. BUTLER.